(12) United States Patent
Mistry et al.

(10) Patent No.: US 9,304,565 B2
(45) Date of Patent: *Apr. 5, 2016

(54) INFORMATION HANDLING SYSTEM POWER SUPPLY AUTOMATED DE-RATING FOR POWER OUTPUT AND THERMAL CONSTRAINTS

(71) Applicant: Dell Products L.P., Round Rock, TX (US)

(72) Inventors: Pradeep Mistry, Austin, TX (US); Mark Muccini, Georgetown, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/581,051

(22) Filed: Dec. 23, 2014

(65) Prior Publication Data

US 2015/0113310 A1    Apr. 23, 2015

Related U.S. Application Data

(63) Continuation of application No. 13/277,452, filed on Oct. 20, 2011, now Pat. No. 8,934,209.

(51) Int. Cl.
| | |
|---|---|
| *H02H 5/00* | (2006.01) |
| *G06F 1/26* | (2006.01) |
| *H02H 3/00* | (2006.01) |
| *G06F 1/20* | (2006.01) |
| *G06F 1/24* | (2006.01) |
| *G06F 1/28* | (2006.01) |
| *G06F 1/30* | (2006.01) |
| *H02H 5/04* | (2006.01) |
| *H02H 3/08* | (2006.01) |

(52) U.S. Cl.
CPC ............... *G06F 1/263* (2013.01); *G06F 1/206* (2013.01); *G06F 1/24* (2013.01); *G06F 1/28* (2013.01); *G06F 1/30* (2013.01); *H02H 3/006* (2013.01); *H02H 3/08* (2013.01); *H02H 5/04* (2013.01)

(58) Field of Classification Search
CPC .............................................. H03K 2017/0806
USPC ........................................................... 361/103
See application file for complete search history.

(56) References Cited

U.S. PATENT DOCUMENTS

| | | | |
|---|---|---|---|
| 6,094,362 A | 7/2000 | Domingo | |
| 6,861,824 B1 | 3/2005 | Liu et al. | |
| 6,927,626 B2* | 8/2005 | Stanley | 330/128 |
| 7,363,522 B2 | 4/2008 | Prosperi | |
| 7,675,250 B2* | 3/2010 | Chitta et al. | 315/309 |
| 7,738,225 B2 | 6/2010 | Briskin | |
| 7,742,305 B2 | 6/2010 | Schweigert et al. | |
| 7,887,235 B2 | 2/2011 | Campos et al. | |
| 7,908,493 B2 | 3/2011 | Bieswanger et al. | |
| 8,135,970 B2 | 3/2012 | Gaskins et al. | |
| 8,730,636 B2* | 5/2014 | Tseng | 361/93.8 |
| 8,934,209 B2* | 1/2015 | Mistry et al. | 361/103 |

\* cited by examiner

*Primary Examiner* — Stephen W Jackson
(74) *Attorney, Agent, or Firm* — Terrile, Cannatti, Chambers & Holland, LLP; Robert W. Holland

(57) ABSTRACT

An information handling system power supply dynamically adapts thermal and power output protection constraints based upon thermal and power output conditions measured at the power supply. In the event of changing conditions at the information handling system, such as an increase in ambient temperature or an increase in power consumption, a power constraint adaptive module adjusts constraints at which the power supply will shut down in order to maintain power to an information handling system outside of a normal power and thermal constraint operating envelope for the power supply.

17 Claims, 6 Drawing Sheets

INFORMATION HANDLING SYSTEM POWER SUPPLY AUTOMATED DE-RATING FOR POWER OUTPUT AND THERMAL CONSTRAINTS

BACKGROUND OF THE INVENTION

1. Field of the Invention

The present invention relates in general to the field of information handling system power supply, and more particularly to an information handling system power supply automated de-rating for power output and thermal constraints.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Over time, information handling systems have provided increased performance as the components used to build information handling systems have increased their processing capability. For example, processors include more transistors that perform processing with greater numbers of cycles in a given time; greater amounts of random access memory (RAM) store instructions for processors with more rapid access times; and hard disk drives spin storage media at greater rates for improved write and read performance. One side effect of this improved performance is that information handling system power use has tended to increase and to have greater variability over time. For example, power consumption by a processor spikes as the processor shifts between idle and full utilization. In order to handle increased power consumption with the greater variability, manufacturers have included more robust power supplies for information handling systems, which has driven up system costs. In some instances, information handling systems that perform critical functions often include a back-up power supply so that each power supply can manage an expected maximum power output with a safety buffer, typically 20%, to ensure that the system continues operational even in the event one power supply fails.

Power supplies typically create heat as a byproduct of generation of DC power for information handling system components. Generally, the amount of heat generated as a byproduct of power supply operations increases as the amount of power output by the power supply increases. Typically, in order to avoid catastrophic failure of a power supply, each power supply includes output overcurrent protection (OCP) and ambient over temperature protection (AOTP) parameters. If the current output by the power supply or the temperature at the power supply increases beyond its fixed operational range set by either the OCP or AOTP parameters, the power supply will shut down or take other safety measures. A disadvantage of OCP and AOTP parameters is that power supplies typically have the parameters set in a fixed operational range that depends upon the information handling system in which the power supply is installed. Setting power supply AOTP and OCP constraints for use in a particular information handling system adds a design step for the manufacture of the information handling system and defines a part with constraints for the information handling system, resulting in increased design and manufacture costs. If AOTP and OCP constraints are increased to provide a buffer that allows use in multiple types of information handling systems, then power supply capabilities are typically sacrificed because performance capabilities exist beyond specified protection parameters, resulting in additional "over-engineering" that increases component prices.

SUMMARY OF THE INVENTION

Therefore a need has arisen for a system and method which supports automated rating changes for power output and thermal protection constraints of an information handling system power supply.

In accordance with the present invention, a system and method are provided which substantially reduce the disadvantages and problems associated with previous methods and systems for setting power output and thermal constraints of an information handling system power supply. Power supply shutdown constraints are dynamically updated based upon measured operating conditions to adapt the power supply operating envelope to measured operating conditions when possible.

More specifically, an information handling system processes information through coordinated operations of plural processing components that are powered by one or more power supplies. An output protection circuit of the power supply shuts down the power supply if current output at the power supply exceeds an output constraint. A thermal protection circuit of the power supply shuts down the power supply if the ambient temperature at the power supply exceeds a thermal constraint. A protection constraint adaptive module adjusts the output constraint and thermal constraint based on measured output and thermal conditions at the power supply to provide power to the information handling system in an extended operating range. For example, the protection constraint adaptive module increases the thermal constraint by decreasing the output constraint or increases the output constraint by decreasing the thermal constraint.

The present invention provides a number of important technical advantages. An example is that the environmental operational range of a power supply is expanded to support a wider number of uses, such as an increased variety of powered information handling systems. Power availability is improved across different thermal environments with improved thermal behavior predictability. Design and manufacture costs are reduced since a given power supply having adaptable output and thermal protection constraints that operate across a greater range of environments works with a wider number of information handling systems and thus reducing the number of power supplies needed for a manufacturer's inventory. Since a power supply automatically adapts protection constraints based upon feedback from a powered system, less time is required in the development, testing and validation of a power supply for a powered system that falls within the power supply's adaptable range. This reduces power supply hardware costs since a given physical power supply unit can adapt to meet a variety of powered systems so that purchases of power supplies involve greater volume with a reduced number of unique power supply part numbers to track in manufacture inventory.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Dynamic updates to power supply protection circuit constraints adapts a power supply for providing an information handling system with power beyond a normal operational range. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
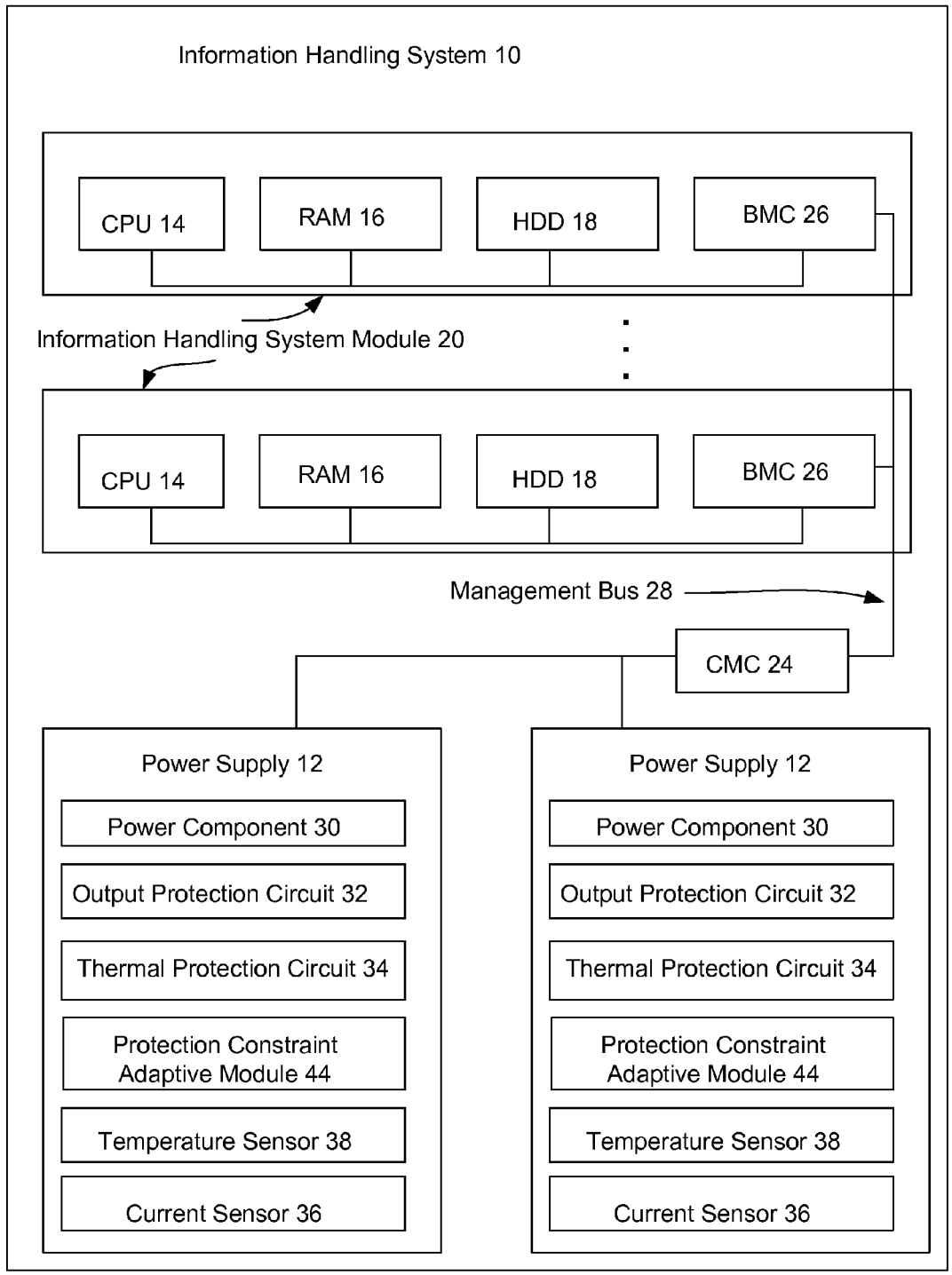
FIG. 1 depicts a block diagram of an information handling system powered by power supplies having adaptive protection constraints.

Referring now to FIG. 1, a block diagram depicts an information handling system 10 powered by power supplies 12 having adaptive protection constraints. Information handling system 10 processes information with plural processing components, such as CPUs 14, RAM 16, and hard disk drives 18 that cooperate to execute applications. In the example embodiment of FIG. 1, information handling system 10 has plural information handling system modules 20 disposed in a chassis 22, such as a server modules disposed in a rack or blade modules disposed in a blade chassis. Chassis 22 has a management processor, such as a chassis management controller (CMC) 24, which manages operation of information handling system modules through a management controller on each module, such as a baseboard management controller (BMC) 26. Communication of management information is performed through a management bus 28, such as an I2C or IPMI bus. Power is provided to run the processing components by one or more power supplies 12, which provides power with power components 30, such as an AC-to-DC adapter that outputs a DC voltage with varying levels of current adjusted to match power needs of the processing components.

Figure 1A:
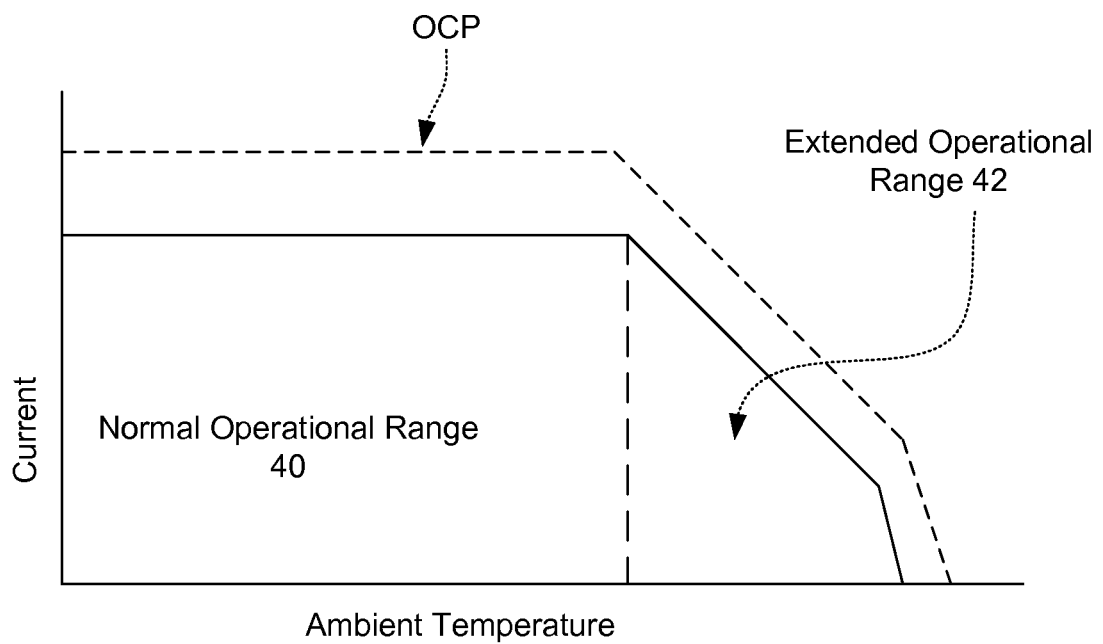
FIG. 1A depicts normal and extended operational ranges for a power supply based on current versus ambient temperature.

During normal operations, management processors 24 and 26 operate the processing components so that power consumption does not exceed the operational capabilities of power supplies 12. For example, each power supply 12 has a maximum current to output and management processors 24 and 26 cooperate to run the processing components at a level that will not exceed the maximum current. For instance, CMC 24 allocates power to each information handling system module 20 so that the BMC 26 on each module 20 will throttle a CPU 14 if power consumption at the module 20 approaches the allocated amount. In the event that too much power is demanded from a power supply 12, an output protection circuit 32 at the power supply 12 detects an excessive current drawn from the power supply 12 and shuts down power components 30. Each power supply also includes a thermal protection circuit 34 that shuts down power components 30 if the temperature at the power supply 12 exceeds a threshold limit. A current sense 36 provides measurements of current draw to output protection circuit 32 and a temperature sense 38 provides measurements of ambient temperature to thermal protection circuit 34 so that the protection circuits can shut down power supply 12 if an output constraint or temperature constraint is exceeded. FIG. 1A depicts a normal operational range 40 for a power supply 12 defined by a maximum current output and ambient temperature. If the current or ambient temperature exceeds the normal operational range as initially set on power supply 12, the protection circuits will shut down power supply 12.

In some circumstances, operation by a power supply outside of the normal operational range is possible and will continue to power information handling system 10 when initial output or thermal protection constraints would otherwise shut down the power supply 12. One example is if the chilling equipment at a data center has difficulty that results in an increased ambient temperature, then increasing the thermal constraint and decreasing the output constraint can allow continued operations of the power supply above the normal operating range thermal constraint by providing power at a lower output level with a lower output constraint. FIG. 1A and FIG. 1C illustrate an example of an extended operating range 42 having a lower output constraint with an increased thermal constraint so that the power supply can output lower amounts of power at an increased ambient temperature.

A protection constraint adaptive module 44 auto configures overcurrent protection and ambient over temperature protection at a power supply 12 to selectively re-define the operational range of the power supply with update output and thermal constraints. Redefining output and thermal constraints allows the power supply 12 to automatically adapt to changing environmental conditions. For example, by increasing the ambient temperature thermal constraint at the power supply 12, protection constraint adaptive module 44 essentially "de-rates" the power supply output capability while maintaining the integrity of the overcurrent protection mechanism. Updated output and thermal constraints are communicated from power supply 12 through management bus 28 to management processor 24 so that information handling system 10 stays within the updated output constraint by limiting power consumption of the processing components as necessary, such as by throttling component operation or load shedding. For short duration events, such as temporary loss of cooling resulting in increased ambient temperature, the output constraint adjusts with a slight delay time sufficient to allow reading, processing and applying operating conditions. For example, a peak power delivery mechanism allows continued operation of information handling system 10 during output load transients that exceed the bandwidth of system load throttling so that the power supply remains operational while algorithms of the protection constraint adaptive module 44 respond.

Figure 1B:
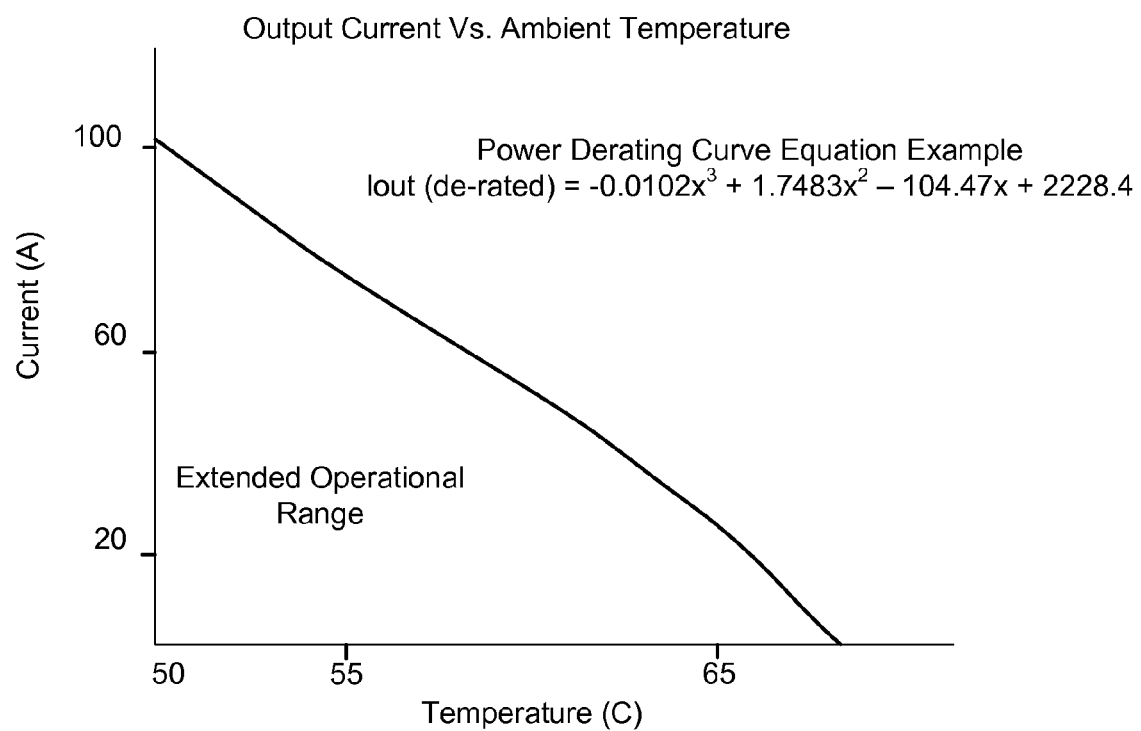
FIG. 1B depicts an extended operational range for a power supply determined by applying operating conditions to a power de-rating formula.
Figure 1C:
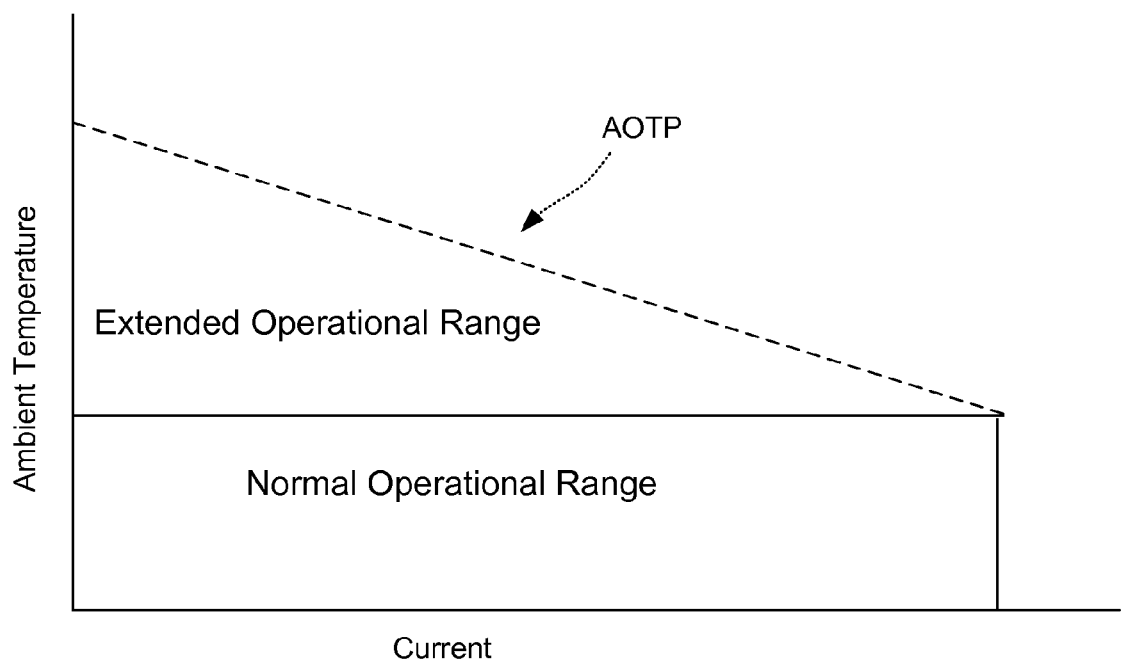
FIG. 1C depicts normal and extended operational ranges for a power supply based AOTP as a function of current.

In one embodiment, thermal and output constraints are updated according to a mathematical formula that defines a power de-rating curve, as depicted by FIG. 1B. Temperature sensed by temperature sensor 38 and current sensed by current sensor 36 are put into the constraints formula to define the thermal and output constraints for the power supply under the measured environment. The thermal and current constraints are provided by power supply 12 to management processor 24 or, alternatively, management processor 24 applies the measured temperature and current levels to the formula to generate the thermal and output constraints independently at the management processor. Management processor 24 stores the formula in local memory, retrieves the formula from power supply 12 or obtains the formula from network resources. In one embodiment, adaptive thermal and output constraints allow a common power supply 12 to fit into multiple different types of information handling system models by adapting to the operational conditions of the information handling system.

Figure 2:
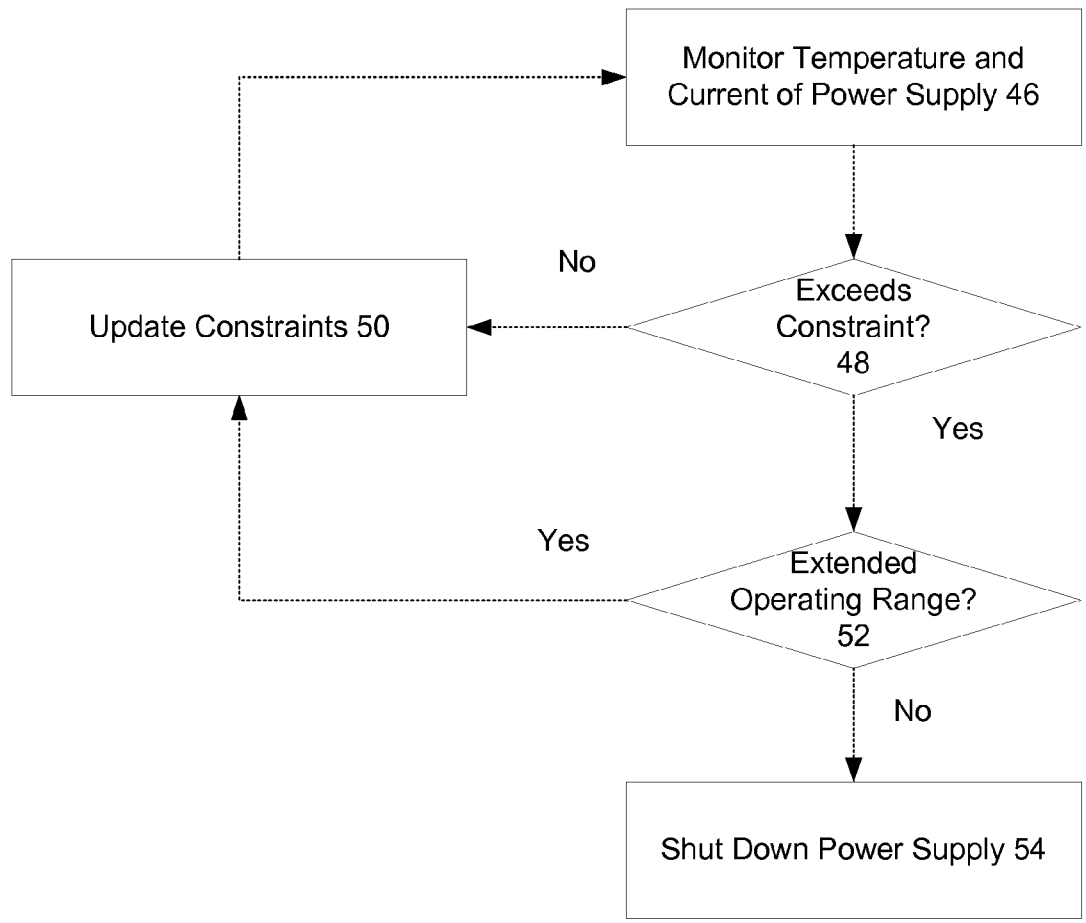
FIG. 2 depicts a flow diagram of a process for updating protection constraints.

Referring now to FIG. 2, a flow diagram depicts a process for updating protection constraints. The process begins at step 46 with monitoring of temperature and output current at the power supply. At step 48, a determination is made of whether the current or temperature measured at the power supply is greater than a threshold constraint. If not, the process continues to step 50 to update the temperature and output constraints. Periodic updates helps to ensure that thermal and output constraints adapt as environmental conditions change. For example, if thermal conditions are approaching the thermal constraint, pre-emptive de-rating of the power supply to a lower maximum current output provides a greater buffer for operation within the current thermal environment. If output conditions are approaching a maximum output current constraint, pre-emptive reduction in ambient temperature provides an increased maximum current output for a greater output buffer to operate within the current environment.

If a thermal or current output constraint threshold is exceeded at step 48 the process continues to step 50 to determine if an extended operational range exists in which continued operation of the power supply is allowed. A slight delay for computing the extended operational range may be provided by a peak delivery mechanism that temporarily uses safety buffers built into the power supply. If an extended range exists to allow continued operation of the power supply the extended range is applied and communicated to the information handling system by updating the thermal and output constraints at step 50. If no extended operational range is available, the process ends at step 54 with a shutdown of the power supply due to a measured output or thermal value in excess of the operational constraints.

Figure 3:
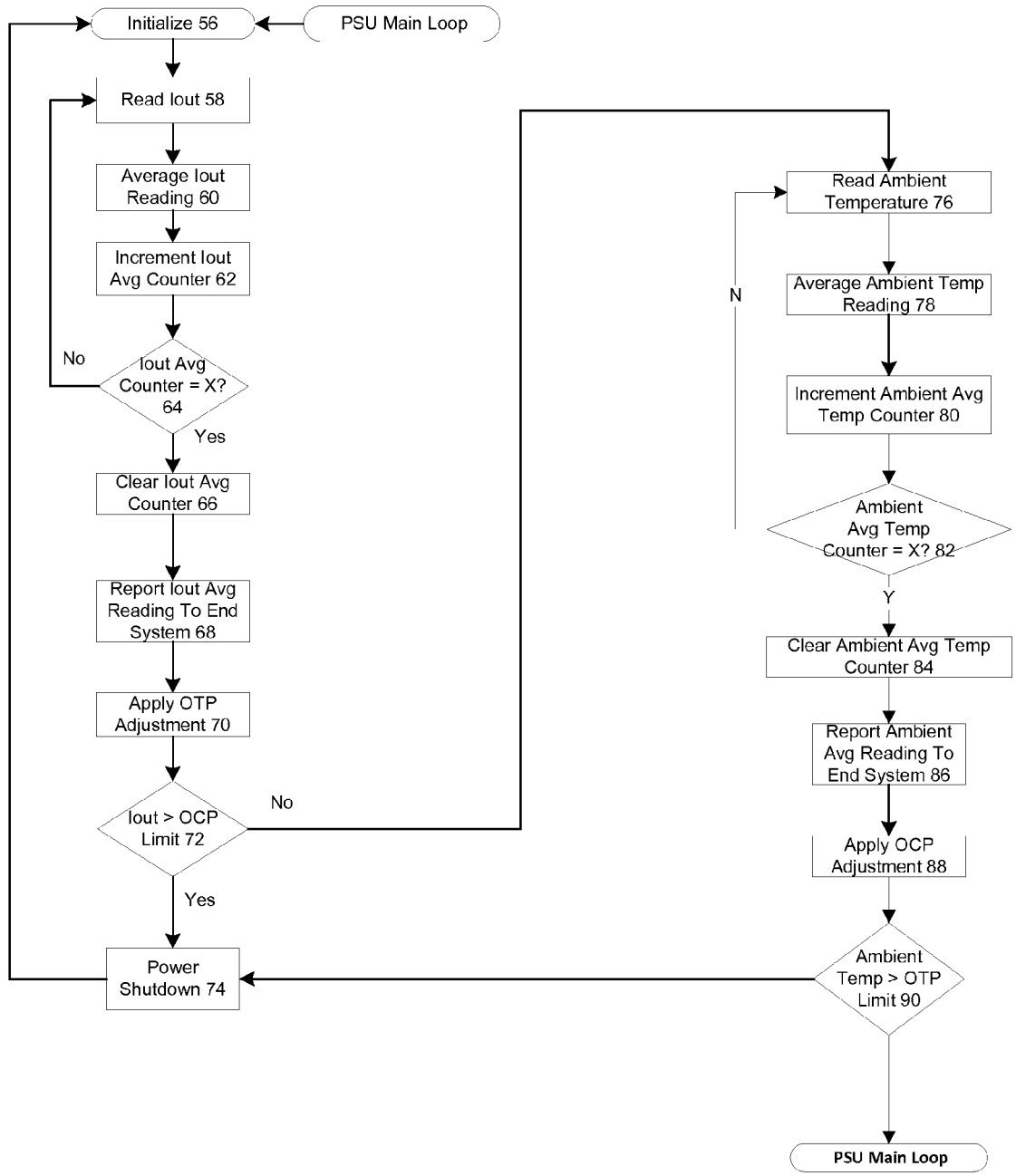
FIG. 3 depicts a process for monitoring power supply operations to adapt thermal and output constraints.

Referring now to FIG. 3, a process is depicted for monitoring power supply operations to adapt thermal and output constraints. The process begins at step 56 with initialization of the power supply using default thermal and output constraint values. At initialization, counters for determining thermal and output average values are set to zero. At step 58, the current output is read from a current sensor. At step 60, an average current output value is computed based upon the number of current readings taken and, at step 62 the current average counter is incremented. At step 64, a determination is made of whether the number of current readings meet the number X needed for a predetermined current average cycle. If the number X is not sufficient, the process returns to step 58 to continue averaging current readings. Once the number X is sufficient, the process continues to step 66 to clear the average counter, to step 68 to report the current average value to the information handling system management processor and to step 70 to apply the average current value to adjust the over temperature constraint. In the example embodiment, reporting the average current value to the management processor allows the management processor to independently apply the value to the adaptive constraint formula and to use the values for managing information handling system operations.

At step 72, a comparison is made between the measured current output and the output constraint. If the measured current output exceeds the output constraint, the process continues to step 74 to initiate a power supply shutdown. If the measured current output is within constraints, the process continues to step 76 to initiate an over current adaption by measuring the average ambient temperature. At step 76 the ambient temperature is measured, at step 78 the average ambient temperature is computed based on the number of measurements and at step 80 the ambient temperature counter is incremented. At step 82, a determination is made of whether a sufficient number of temperature measurements are done to compute the average ambient temperature. If an insufficient number of measurements have been done, the process continues to step 76 to make additional temperature measurements. If the number of measurements is sufficient at step 82, the process continues to step 84 to clear the average counter and to step 86 to report the ambient average temperature reading to the information handling system so that the management processor can compute an over current output constraint under which the information handling system must operate to avoid an over current protection shutdown of the power supply. At step 88, the power supply computes an update over current output constraint and, at step 90 compares the current measurement with the updated constraint to determine if the power supply should shutdown at step 74. If the current drawn from the power supply is less than the updated output constraint, then the power supply continues with normal operations.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to cooperate to process information;
   first and second power supplies operable to provide power to the plural processing components, each power supply having an adjustable output current constraint and thermal constraint; and
   a constraint adaptive module interfaced with the first and second power supplies and operable to dynamically adjust the output current constraint and the thermal constraint at the first power supply in response to a predetermined condition at the second power supply.

2. The information handling system of claim 1 further comprising a management processor interfaced with the processing components and operable to adjust power consumption of the processing components, the management processor further operable to receive the dynamically adjusted output current constraint from the constraint adaptive module and to manage power consumption of the processing components to remain below the dynamically adjusted output current constraint.

3. The information handling system of claim 2 wherein the processing components comprise plural processing modules disposed in a chassis and the management processor comprises a chassis management controller that manages power of the chassis.

4. The information handling system of claim 2 wherein the processing components comprise a processing module and the management processor comprises a baseboard management controller that manages power of the processing module.

5. The information handling system of claim 2 wherein the management processor is further operable to dynamically compute the dynamically adjusted current output constraint based upon thermal and output current measurements sensed at the first power supply and communicated to the management processor.

6. The information handling system of claim 5 wherein the constraint adaptive module provides a constraint formula to the management processor, the management processor operable to apply the constraint formula to dynamically compute the predetermined output current constraint.

7. The information handling system of claim 1 wherein the constraint adaptive module dynamically adjusts the thermal constraint and output current constraint by increasing a maximum allowed power supply output current and decreasing a maximum allowed power supply ambient temperature.

8. The information handling system of claim 1 wherein the constraint adaptive module dynamically adjusts the thermal constraint and output current constraint by increasing a maximum allowed power supply temperature and decreasing a maximum allowed power supply output current.

9. A method for powering an information handling system with plural power supplies, the method comprising:
monitoring power output by the power supplies;
shutting down one of the power supplies if power output at the one power supply exceeds a power output constraint;
monitoring temperature associated with the power supplies;
shutting down one of the power supplies if the temperature at the one power supply exceeds a thermal constraint;
detecting a failure of one of the power supplies; and
in response to detecting, applying the monitored power output and temperature to dynamically reset the output constraint and thermal constraint of the other of the power supplies that remains operational.

10. The method of claim 9 wherein in response to detecting further comprises increasing the output constraint of the other of the plural power supplies that remains operational by decreasing the thermal constraint.

11. The method of claim 10 further comprising:
communicating the failure and the increased output constraint to the information handling system; and
managing operation of the information handling system to maintain power consumption below the increased output constraint.

12. The method of claim 9 wherein in response to detecting, applying the monitored power output and temperature to dynamically reset the output constraint and the thermal constraint further comprises calculating a power rating at the power supply by inputting values from the monitoring power output and the monitoring temperature.

13. The method of claim 12 further comprising:
communicating the reset output constraint to the information handling system; and
managing power consumption at the information handling system to remain below the reset output constraint.

14. The method of claim 9 further comprising:
calculating the reset output constraint at the information handling system by inputting the values from the monitoring power output and the monitoring temperature; and
managing power consumption at the information handling system to remain below the calculated reset output constraint.

15. A power supply comprising:
a power component operable to output power at variable power settings to power a device;
an output protection circuit operable to shut down the power component at an output constraint;
a thermal protection circuit operable to shut down the power component at a thermal constraint; and
a protection constraint adaptive module interfaced with the output protection circuit and the thermal protection circuit, the protection constraint adaptive module operable to dynamically adjust the thermal constraint and output constraint based upon thermal and output measurements associated with the power component, the protection constraint adaptive module dynamically adjusting the thermal and output constraints according to a constraint formula, the protection constraint adaptive module further operable to communicate predetermined of the constraint formula to an information handling system for the information handling system to independently determine the dynamically adjusted thermal and output constraints.

16. The power supply of claim 15 wherein the protection constraint adaptive module selectively increases the output constraint by decreasing the thermal constraint if the output measurement is within a predetermined amount of the output constraint and the thermal measurement is greater than a predetermined amount from the thermal constraint.

17. The power supply of claim 15 wherein the protection constraint adaptive module selectively increases the thermal constraint by decreasing the output constraint if the thermal measurement is within a predetermined amount of the thermal constraint and the output measurement is greater than a predetermined amount from the output constraint.

* * * * *